(12) United States Patent
Kurth (10) Patent No.: US 9,709,173 B2
(45) Date of Patent: Jul. 18, 2017

(54) SEALING ASSEMBLY (71) Applicant: Juergen Kurth, Odenthal (DE)

(72) Inventor: Juergen Kurth, Odenthal (DE)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 14/251,075

(22) Filed: Apr. 11, 2014

(65) Prior Publication Data

US 2014/0312571 A1 Oct. 23, 2014

(30) Foreign Application Priority Data

Apr. 18, 2013 (DE) .................. 10 2013 207 029

(51) Int. Cl.
F16J 15/3244 (2016.01)

(52) U.S. Cl.
CPC ................. F16J 15/3244 (2013.01)

(58) Field of Classification Search
USPC .............. 277/549, 563, 562, 570, 559, 400
See application file for complete search history.

(56) References Cited

U.S. PATENT DOCUMENTS

| | | | | | |
|---|---|---|---|---|---|
| 3,586,342 A | * | 6/1971 | Staab | ............ | 277/559 |
| 3,785,660 A | * | 1/1974 | Bush | ............ | 277/559 |
| 3,934,888 A | * | 1/1976 | Lutz | ............ | 277/559 |
| 3,973,781 A | * | 8/1976 | Grorich | ............ | 277/559 |
| 4,084,826 A | * | 4/1978 | Vossieck et al. | ............ | 277/559 |
| 4,183,543 A | * | 1/1980 | Antonini | ............ | 277/559 |
| 4,288,083 A | * | 9/1981 | Braconier | ............ | 277/559 |
| 4,560,174 A | * | 12/1985 | Bisi | ............ | 277/382 |
| 4,995,623 A | * | 2/1991 | Wada et al. | ............ | 277/552 |
| 5,002,289 A | * | 3/1991 | Yasui et al. | ............ | 277/559 |
| 5,082,295 A | * | 1/1992 | Wetzel | ............ | 277/550 |
| 5,139,275 A | * | 8/1992 | Ehrmann et al. | ............ | 277/559 |

(Continued)

FOREIGN PATENT DOCUMENTS

| | | |
|---|---|---|
| CN | 2388421 Y | 7/2000 |
| CN | 201354849 Y | 12/2009 |

(Continued)

OTHER PUBLICATIONS

Handbuch der Dichtungstechnik, Seite 320.
Fluidtechnik, Fachverband Fluidtechnik S. 685 bis 699.
Tae, 18. International Colloquium, Tribology—Eingang Einspruch.

*Primary Examiner* — Kristina Fulton
*Assistant Examiner* — Eugene G Byrd
(74) *Attorney, Agent, or Firm* — Bryan Peckjian; SKF USA Inc. Patent Dept.

(57) ABSTRACT

A radial-shaft sealing assembly includes a sealing lip disposed on a support ring. A cylindrical portion of the sealing lip that abuts on a rotatable shaft contains an elastomeric material and has a profiling for pumping oil or lubricant back to an oil side of the sealing assembly. The profiling includes first and second annular ridges disposed in parallel, and first and second groups of radially-projecting pumping elements disposed therebetween and distributed around the circumference of the cylindrical portion. Each pumping element extending at an angle ($\alpha$) to the circumferential direction (U) of the cylindrical portion, but the first group of pumping elements has an opposite orientation to the second group of pumping elements.

24 Claims, 5 Drawing Sheets

(56) References Cited

U.S. PATENT DOCUMENTS

| | | | |
|---|---|---|---|
| 5,350,181 A | 9/1994 | Horve | |
| 5,649,709 A * | 7/1997 | Munekata et al. | 277/560 |
| 5,649,710 A * | 7/1997 | Kanda | 277/371 |
| 6,045,138 A * | 4/2000 | Kanzaki | 277/562 |
| 6,276,691 B1 * | 8/2001 | Nishigaki et al. | 277/353 |
| 6,336,638 B1 * | 1/2002 | Guth et al. | 277/500 |
| 6,688,603 B2 * | 2/2004 | vom Schemm | 277/553 |
| 6,726,211 B1 * | 4/2004 | Kuroki et al. | 277/353 |
| 6,860,486 B2 * | 3/2005 | Hacker et al. | 277/553 |
| 6,921,080 B2 * | 7/2005 | Johnen | 277/549 |
| 6,921,082 B2 * | 7/2005 | Lutaud | 277/559 |
| 7,004,471 B2 * | 2/2006 | Bryde et al. | 277/318 |
| 7,506,875 B2 * | 3/2009 | Matsui | 277/559 |
| 7,670,111 B2 | 3/2010 | Maass et al. | |
| 7,775,528 B2 * | 8/2010 | Berdichevsky | 277/559 |
| 7,828,300 B2 * | 11/2010 | Munekata | 277/559 |
| 7,891,670 B2 * | 2/2011 | Alajbegovic | 277/559 |
| 7,942,423 B2 * | 5/2011 | Kondo et al. | 277/353 |
| 8,651,496 B2 | 2/2014 | Kurth et al. | |
| 2003/0189293 A1 * | 10/2003 | Johnen | 277/394 |
| 2004/0227304 A1 | 11/2004 | Kern et al. | |
| 2005/0242521 A1 * | 11/2005 | Bock et al. | 277/559 |
| 2006/0012128 A1 * | 1/2006 | Lutaud | 277/559 |
| 2006/0103075 A1 * | 5/2006 | Zahn | 277/436 |
| 2006/0186604 A1 * | 8/2006 | Berdichevsky | 277/559 |
| 2007/0152405 A1 * | 7/2007 | Wen et al. | 277/559 |
| 2007/0187905 A1 | 8/2007 | Berdichevsky | |
| 2008/0088094 A1 | 4/2008 | Borowski et al. | |
| 2009/0134586 A1 * | 5/2009 | Arai et al. | 277/563 |
| 2009/0166981 A1 * | 7/2009 | Kondo et al. | 277/549 |
| 2011/0018209 A1 * | 1/2011 | Dahlhaus-Preussler | 277/562 |
| 2011/0031701 A1 * | 2/2011 | Kurth | F16J 15/3224 277/585 |
| 2011/0204579 A1 * | 8/2011 | Donovan et al. | 277/559 |
| 2011/0316238 A1 * | 12/2011 | Schmitt | 277/559 |
| 2012/0193876 A1 | 8/2012 | Kurth | |

FOREIGN PATENT DOCUMENTS

| | | |
|---|---|---|
| CN | 201407356 Y | 2/2010 |
| DE | 3702018 C1 | 11/1987 |
| DE | 10154789 A1 | 5/2003 |
| DE | 10313162 A1 | 10/2004 |
| WO | 2012069407 A1 | 5/2012 |

* cited by examiner

SEALING ASSEMBLY

CROSS-REFERENCE

This application claims priority to German patent application no. 10 2013 207 029.2 filed on Apr. 18, 2013, the contents of which are incorporated herein by reference.

TECHNICAL FIELD

The present teachings generally relate to a radial-shaft sealing assembly that includes a support ring, on which at least one sealing lip is disposed, the sealing lip having a cylindrical surface section configured to abut on a shaft in order to seal the shaft between an air side and an oil side.

RELATED ART

Radial shaft seals of this type are well known in the prior art. Such seals having surface-abutting sealing lips may be provided with a helical groove or similar return-pumping elements for return-pumping of oil. Generally speaking, such seals are designed such that they have a preferred direction of rotation. Return-pumping elements which pump equally well in both directions of rotation have been little-used to date in significant quantities or in industrial series. Bidirectional pumping structures can be introduced as grooves in the contact region between the to-be-sealed shaft and the sealing sleeve (cylindrically formed surface section).

Polytetrafluoroethylene (PTFE) is often used as the material of the sealing element, i.e. of the sealing lip. However, during idling or when sealing lips made of PTFE are under pressure, the oil or lubricant can escape (leak) through the pumping structures or through capillary channels in the contact region between the sealing lip material and the shaft surface. Such capillary channels can form either due to the inclusion of fibrous filler materials in the PTFE, or due to the surface of the sealing lip being insufficiently smooth.

SUMMARY

In one aspect of the present teachings, a radial-shaft sealing assembly is provided that is capable of achieving a good, equivalent fluid return-pumping effect in both directions of rotation of a shaft to be sealed, so that the oil side can be reliably sealed with respect to the air side.

In another aspect of the present teachings, a radial-shaft sealing assembly preferably comprises at least one sealing lip disposed on a support ring. A cylindrical surface section of the at least one sealing lip is configured to abut on a rotatable shaft in order to seal the shaft between an air side and an oil side. The sealing lip is comprised of an elastomer material. A profiling for return-pumping of oil or lubricant during rotation of the shaft is disposed or defined in or on the cylindrical surface section, and the profiling comprises:
- a first radially-projecting annular ridge configured to abut on the shaft, wherein the first annular ridge is disposed adjacent to the air side in a first edge region of the cylindrical surface section,
- a second radially-projecting annular ridge configured to abut on the shaft, wherein the second annular ridge is disposed adjacent to the oil side in a second edge region of the cylindrical surface section, the second edge region being opposite of the first edge region in an axial direction of the radial-shaft sealing assembly,
- a first group of radially-projecting pumping elements disposed in an axial region between the first and second annular ridges, distributed around the circumference, and each extending at a first angle to the circumferential direction, and
- a second group of radially-projecting pumping elements disposed in the axial region between the first and second annular ridges, distributed around the circumference, and each extending at a second angle, the second angle being the same as the first angle, but having an opposite orientation to the circumferential direction than the first angle.

Preferably, the pumping elements of the first-mentioned group respectively alternate with the pumping elements of the second-mentioned group in the circumferential direction.

The angle (i.e. the first angle) of the pumping elements relative to the circumferential direction is preferably between 5° and 30°.

The pumping elements preferably do not contact the first annular ridge in the region adjacent to the air side. However, the pumping elements contact the second annular ridge in the region adjacent to the oil side. Each pair of adjacent first and second pumping elements preferably forms a V-shape, or a trough-shape as viewed in the radial direction.

The first annular ridge and/or the second annular ridge preferably have (each has) a contour in the radial section, which contour is characterized by a first flank facing towards the air side and a second flank facing towards the oil side, which flanks have respective flank angles to the axis of the shaft, wherein the flank angle facing towards the air side is smaller than the flank angle facing towards the oil side. The first flank angle facing towards the air side preferably falls between 10° and 20°; the second flank angle facing towards the oil side preferably falls between 40° and 60°.

The pumping elements can have a contour in a section perpendicular to their longitudinal axis, which contours are characterized by flanks having respective flank angles, wherein the flank angles are differently sized.

According to another aspect of the present teachings, a fluid guide element can be disposed between each two adjacent pumping elements that, as viewed in the axial direction, extend towards each other in the edge region adjacent to the air side. As viewed in the radial direction, the fluid guide element can be triangular shaped, wherein one side of the triangular structure borders on the first annular ridge or is connected thereto and/or extends parallel or collinear thereto. In such an embodiment, the triangular structure can be formed as a radially projecting elevation in the cylindrical surface section. The triangular structure can also be formed by radially-inward-projecting ridge elements that are disposed in a triangular manner.

According to an alternative design, the fluid guide element can instead be formed by radially projecting ridge sections in the cylindrical surface section of the sealing lip.

According to another aspect of the present teachings, a plurality of reinforcing ridges can be disposed in the radially outer-lying region (on a radially outer surface) of the cylindrically formed surface section of the sealing lip. The reinforcing ridges preferably extend parallel to the axial direction of the shaft. Such additional reinforcing ridges on the rear side of the radially-outer surface of the cylindrical surface section stabilize the cylindrical shape of the sealing region. Preferably, the ridges are disposed uniformly or equidistantly around the circumference.

According to another aspect of the present teachings, a sealing ring (sealing lip) is provided that has a sealing sleeve (cylindrically-shaped surface section of the sealing lip) manufactured as one piece made from elastomeric material and a pumping structure that is independent of the direction of rotation. The pumping structure is provided in a ridge-like manner at an alternating angle of incidence (preferably between 5° and 30°) between two circumferential ridge-type rings/projections (annular ridges). In use, the two angular ridges and the ridges of the pumping structure lying therebetween abut on the surface of the shaft under an elastic preload.

In comparison to PTFE seals, it is advantageous that, when using elastomeric material (PTFE can however optionally be present as filler material in the elastomeric material), a high smoothness of the surface of the sealing lip is provided, so that it is not necessary to care for (utilize) short-fiber filler materials, as is the case with the use of PTFE materials that contain fillers. Furthermore, it is advantageous that no high temperatures and pressing forces are required during the shaping of the sealing lip comprised at least substantially of an elastomeric material, as is required in the precise geometric forming/shaping of PTFE. The use of elastomeric material as the sealing material also ensures a capillary-free contact surface on the shaft surface in the region of the pumping structures.

In contrast to the use of PTFE as the sealing material, with the use of elastomeric material a reliable gas-sealing for testing the correct assembly is ensured even during idling.

The elastic behavior of the sleeve material (elastomeric material) leads to a static sealing abutment on the shaft surface. Possible capillary effects as in the case of PTFE sleeve seals do not occur.

In comparison to PTFE as the sealing material, a detailed and smooth shaping in the structural region is economically feasible with known manufacturing processes for forming elastomeric seals. On the other hand, the shaping of PTFE disadvantageously requires significantly higher energy in the form of pressure and temperature.

Exemplary embodiments will be described and explained in more detail below with reference to the accompanying Figures. Further objects, advantages, designs and embodiments of the present teachings will be apparent therefrom.

DETAILED DESCRIPTION OF THE PREFERRED EMBODIMENTS

Figure 1:
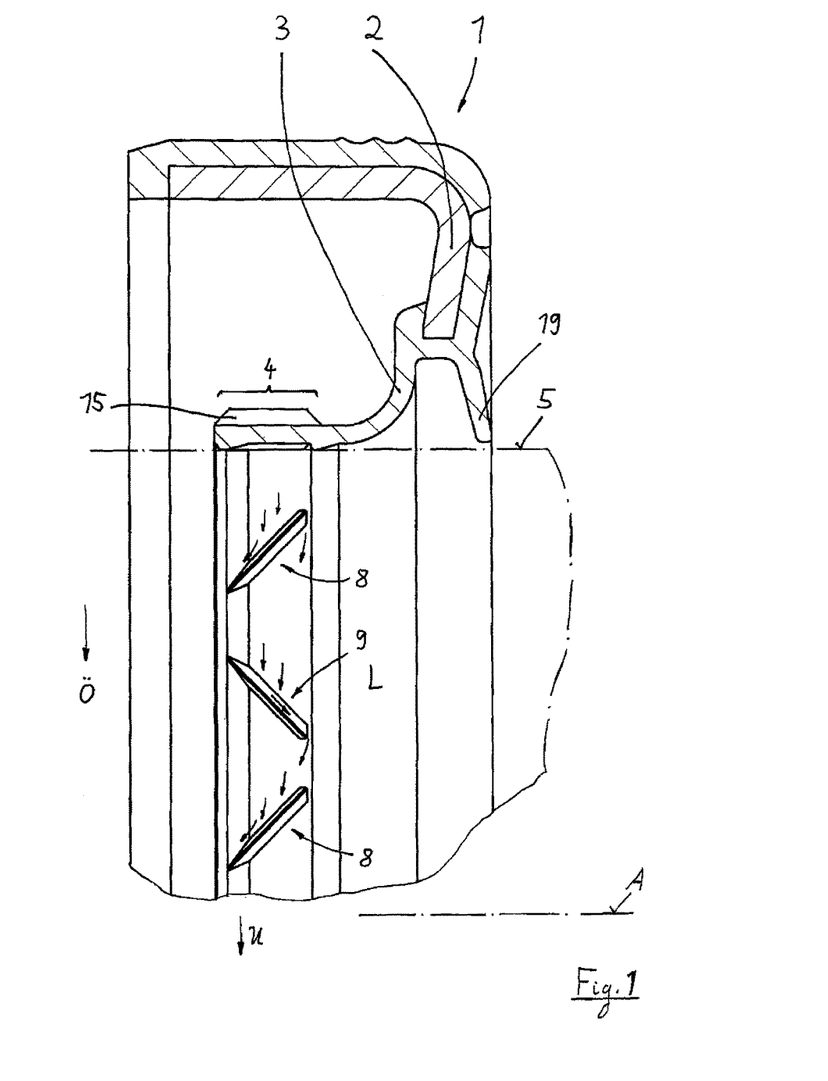
FIG. 1 shows, in radial section, a radial-shaft sealing assembly, with which a shaft is sealed between an air side and an oil side.

In FIG. 1 a radial-shaft seal assembly 1 can be seen which includes a support ring 2, on which a sealing lip 3 is disposed. In addition to an optional dust lip 19, the sealing lip 3 has a cylindrically-formed (cylindrical) surface section 4, which is formed or configured to sealingly abut on the outer circumference of a shaft 5 shown with a dash-dot line. The shaft 5 has a rotational axis X. An oil side OS is sealed from an air side AS by the sealing assembly 1.

Figure 2:
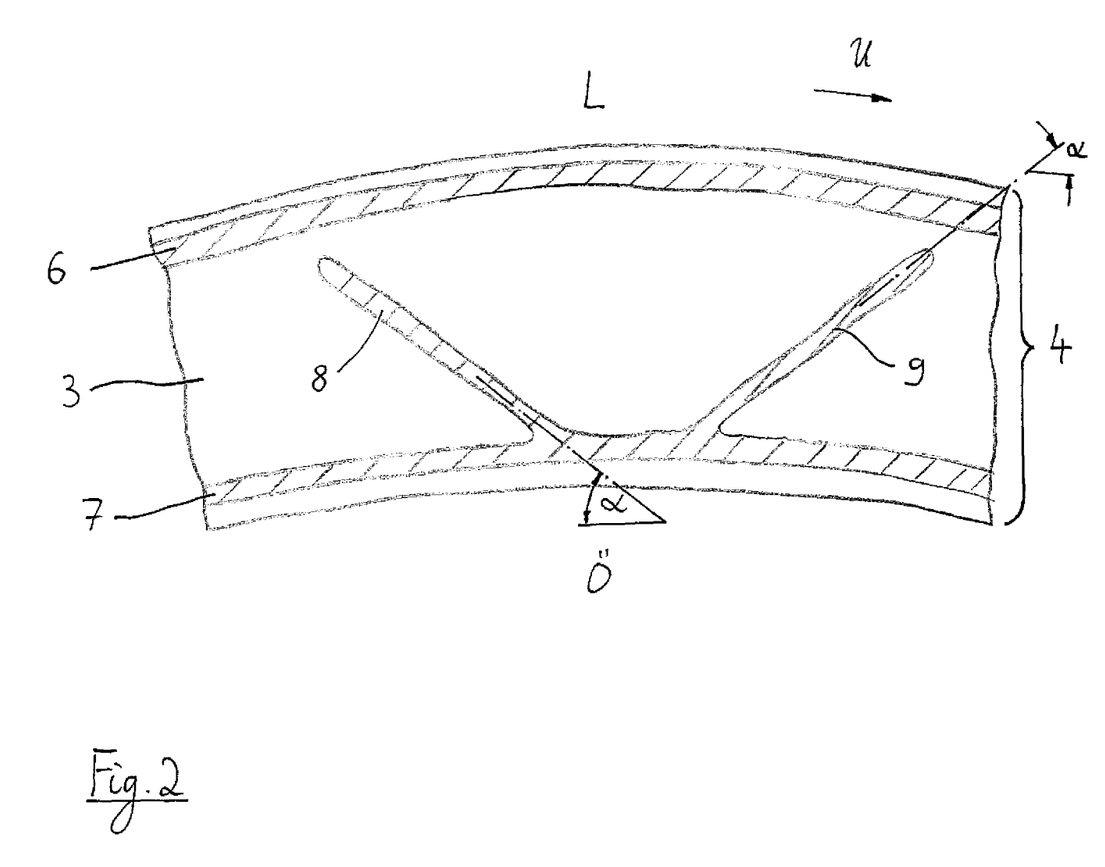
FIG. 2 shows a view from the radial direction onto a part of a cylindrically formed surface section of a sealing lip of the radial-shaft sealing assembly.

The sealing assembly 1 is designed to operate such that an oil (lubricant) return-pumping effect is generated in both directions of rotation of the shaft 5. For this purpose the design of a profiling on the side of the cylindrical surface section 4 that faces towards the shaft 5 is important. A preferred profiling can be understood by viewing FIGS. 1 and 2 together. In FIG. 2 a cutout of a representative portion of the cylindrical surface section 4 is illustrated. This portion abuts on the surface of the shaft 5 under a preload when the sealing assembly 1 is used (installed) as intended.

As shown in FIGS. 1 and 2, a first annular ridge 6 is incorporated in (disposed on) the surface section 4, e.g., as a radially-inward-projecting region (radially-inward projection). The annular ridge 6 abuts on the shaft 5 during operation and is disposed adjacent to the air side A in a first edge region of the cylindrical surface section 4.

Furthermore a second annular ridge 7 is incorporated in (disposed on) the surface section 4, again as a radially-inward-projecting region (radially-inward projection) which abuts on the shaft 5 during operation. The second annular ridge 7 is disposed adjacent to the oil side OS in a second edge region of the cylindrical surface section 4. The first edge region is opposite of (spaced from) the second edge region in the axial direction X of the sealing assembly 1.

Two groups of pumping elements 8 and 9 are provided to perform the oil (lubricant) return-pumping function. A first group of pumping elements 8, which are disposed in the axial region between the annular ridges 6, 7 and are distributed, preferably evenly distributed, around the circumference, extend at an angle $\alpha$ to the circumferential direction U. A second group of pumping elements 9, which are also disposed in the axial region between the annular ridges 6, 7 and are distributed, preferably evenly distributed, around the circumference, also extend at the same angle $\alpha$, however with opposite orientation to the circumferential direction U.

That is, if the (first) angle formed by a tangent to the circumferential direction U of the surface section 4 and pumping element 8 is represented by $\alpha 1$ and the (second) angle formed by the same tangent to the circumferential direction U of the surface section 4 and pumping element 9 is represented by $\alpha 2$, then the relationship between these two (first and second) angles is expressed by the equation:

$$\alpha 1 = 180° - \alpha 2.$$

The first group of pumping elements 8 does not intersect or directly contact the second group of pumping elements 9. Both of the first group and the second group of pumping elements 8, 9 intersects or directly contacts the annular ridge 7 on the oil side OS. Each pair of adjacent pumping elements 8, 9 preferably forms a V-shape, trough-shape or half-hexagon (semi-hexagon) shape as viewed in the radial direction.

As can best be seen from FIG. 2, each pumping element 8, 9 is comprised of a radially-inwardly-elevated ridge structure that is designed to contact the shaft 5 during operation. In FIG. 1, the arrows adjacent the pumping structures show how the oil (lubricant) flows when the shaft 5 rotates in the direction of the arrow on the left side in FIG. 1. The arrows thus indicate the oil flow when the sealing assembly 1 is in sealing contact with the shaft 5. The operation and function of the pumping elements 8, 9 is further described in more detail in the following.

The oil flow is redirected at each of the pumping elements 8, 9. During a given direction of rotation of the shaft, one group of pumping elements (pumping elements 8 in the rotational direction shown in FIG. 1) guides the oil or lubricant back towards the oil chamber (i.e. oil side OS). The other group of pumping elements (pumping elements 9 in the rotational direction shown in FIG. 1) guides the oil or lubricant towards the air side A in a significantly lessened manner; however this group allows an overflow (spill over) of the oil or lubricant through an axial gap between the pumping element and the annular ridge 6 to the subsequent pumping element, which then pumps the oil or lubricant towards the oil side OS.

The circumferential abutment section (annular ridge 6) disposed on the air side AS prevents an unhindered outflow of oil to the air side AS.

When the direction of rotation changes, the pumping elements perform the respective inverse functions.

Preferably, the pumping elements 8, 9 are disposed evenly distributed (equidistantly) in pairs around the circumference (circumferential direction U) of the cylindrical surface section 4.

For reinforcing of the cylindrical surface section 4, a plurality of reinforcing ridges 15 may be disposed on the radially-outer side of the surface section 4 around the circumference (circumferential direction U) of the cylindrical surface section 4, preferably equidistantly. One representative reinforcing ridge 15 is shown in each of FIGS. 1 and 3.

Figure 3:
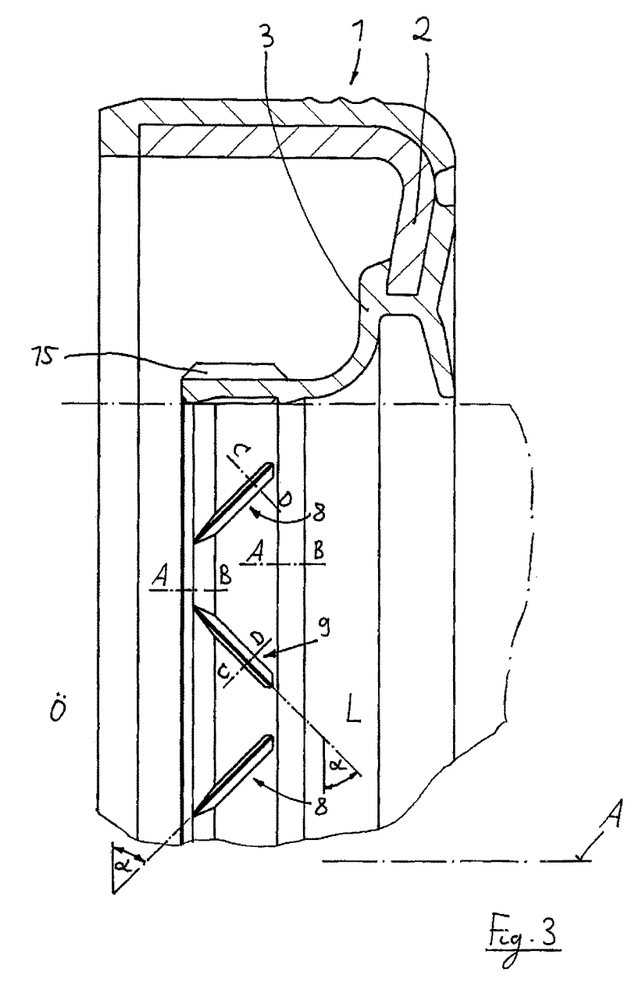
FIG. 3 shows, in radial section, a radial-shaft sealing assembly according to FIG. 1 with further geometric parameters indicated therein.
Figure 4:
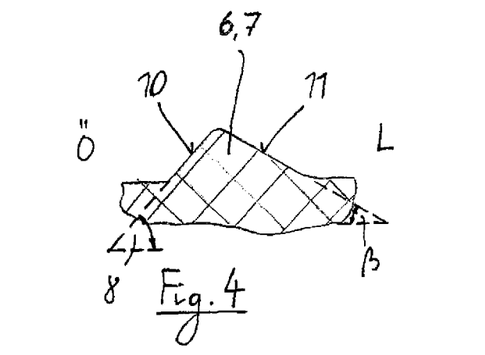
FIG. 4 shows the section A-B according to FIG. 3.
Figure 5:
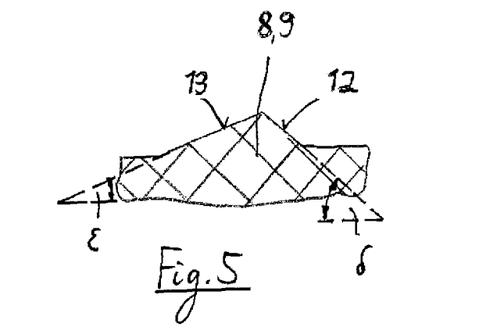
FIG. 5 shows the section C-D according to FIG. 3.

Additional details of the design of the annular ridges 6 and 7 as well as the pumping elements 8 and 9 are apparent from FIGS. 3, 4 and 5. In particular, reference is made to the cross-sections of cross-sections A-B and C-D shown in FIG. 3, which are illustrated in FIGS. 4 and 5.

As shown in FIG. 4, the annular ridges 6, 7 have first and second flanks 10 and 11 that are respectively provided with different flank angles $\beta$ and $\gamma$.

In a similar manner the pumping elements 8 and 9 shown in FIG. 5 have flanks 12 and 13 which are disposed at respective (different) flank angles $\delta$ and $\epsilon$. By intentionally setting the flank angles to be different, the resistance, by which fluid can be pumped or retained, can be influenced.

Figure 6:
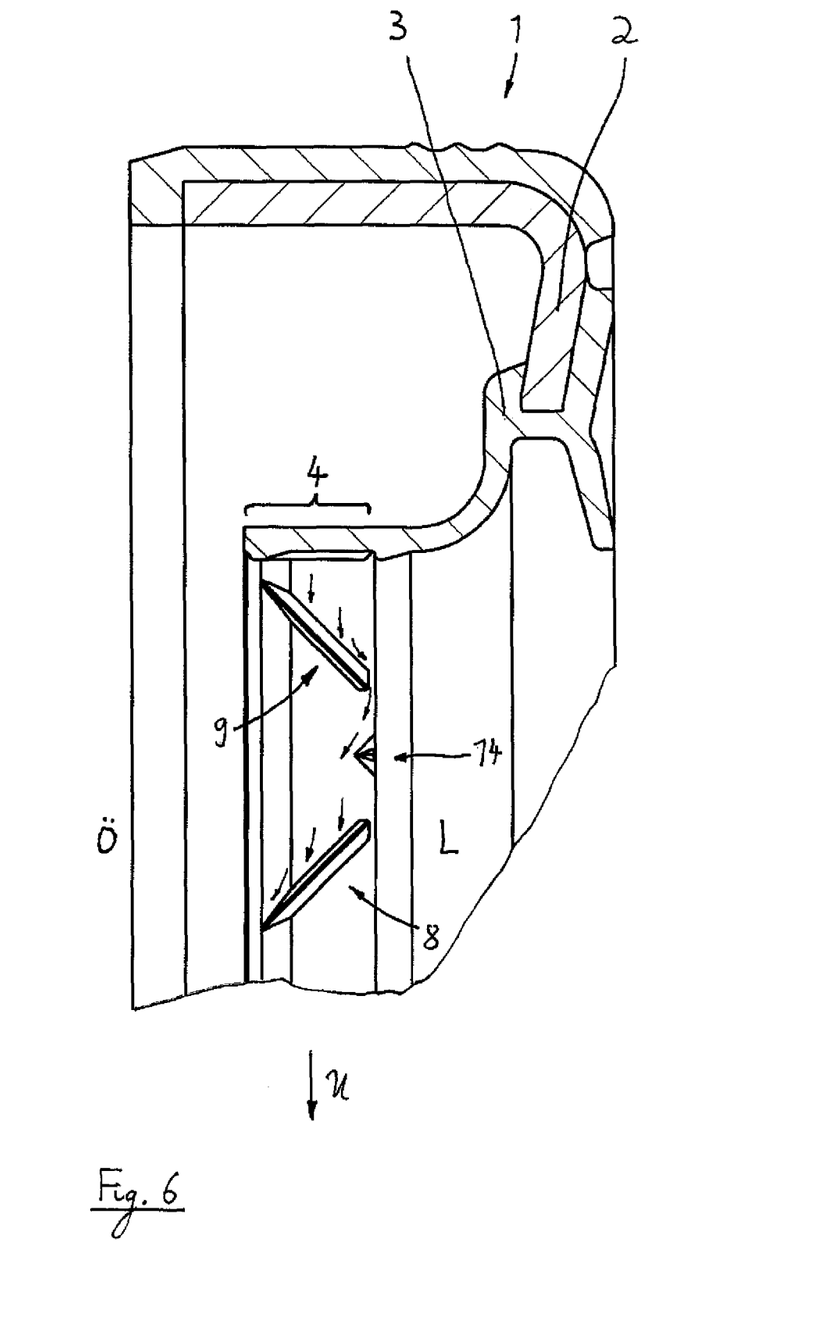
FIG. 6 shows, in radial section, a radial-shaft seal assembly according to FIG. 1 in a further modified embodiment.

A further embodiment of the present teachings is illustrated in FIG. 6. As shown therein, a portion of the surface section 4 adjacent the air side AS is provided with a plurality of fluid guide elements 14 (only one shown in FIG. 6) distributed around the circumference (circumferential direction U) of the cylindrical surface section 4. In this exemplary embodiment, the fluid guide elements 14 are triangular shaped, and one fluid guide element 14 is centrally disposed between two pumping elements 8 and 9, as shown in FIG. 6. The fluid guide elements could instead also be formed as a wedge-shaped structure by means of two intersecting ridges.

As indicated by the arrows shown in FIG. 6, the oil or lubricant flow can be influenced by the fluid guide element 14 so that, when rotating in either rotational direction of the shaft 5, an oil return-pumping effect takes place at the intrinsic pumping structures and then to the oil side.

The present sealing arrangement may preferably function in the following manner.

The one circumferential annular ridge 7 seals the oil chamber OS relative to the air side AS. Any oil or lubricant, which (unintentionally) passes over or across the oil-side annular ridge 7 during operation, is caught (swept) by the ridge-shaped pumping elements 8, 9, guided back to the oil-side annular ridge 7 and then pressed under the oil-side annular ridge 7.

Any oil or lubricant, which was not pumped back toward the oil side OS by the pumping element 8, 9 spills over or passes around the pumping element on the air side A thereof, and then is caught by the subsequent (following) ridge-shaped pumping element 8, 9, which is arranged in an opposite direction or orientation. However, the opposite circumferential annular ridge 6 closest to the air side A prevents the oil or lubricant from leaking (escaping) towards the air side AS. The oil or lubricant that spills over or passes around the pumping element 8, 9 on the air side is then caught by the following pumping element 8, 9 in order to be pressed under the circumferential annular ridge 7.

An interruption or gap (axial gap) of the contact zone between the ridge-type pumping elements 8, 9 and the air-side circumferential annular ridge 6 is essential for this oil return function. That is, it is important that the pumping elements 8, 9 terminate in the axial direction prior to reaching the annular ridge 6 on the air side AS, so that an axial space or gap is provided for oil or lubricant to pass around or spill over to the next pumping element 8, 9 without being pressed under the annular ridge 6.

In order to increase the sealing effect or pumping effect of the circumferential annular ridges 6, 7, they are provided with the above-described asymmetric flank angles $\beta$, $\gamma$ (for example, 50° flank angle on the oil side and 15° angle on the air side). The pumping elements 8, 9 are preferably also formed, as was explained above, with asymmetric flank angles $\delta$, $\epsilon$; the caught oil is thereby wiped by the steep flanks from the shaft surface and pumped back to the oil side OS. On the opposing flat flank, the oil can more easily pass under the ridge (the ridge-type pumping element floats more easily) and thus arrives at the pumping element subsequent thereto.

Due to the minor-symmetric arrangement of the pumping elements 8, 9, the oil (lubricant) return-pumping effect is effected in both directions of rotation of the shaft 5.

A continuously decreasing cross-section in the region of the ramp may be utilized to effect a shear rate in the oil film which will assist the return-pumping of the medium (oil or lubricant) to the oil side OS.

At least the cylindrical surface section is at least substantially comprised of elastomeric material, such as without limitation saturated or unsaturated rubbers and/or thermoplastic elastomers. Preferably, at least the cylindrical surface section comprises at least 50 wt % elastomer, more preferably at least 60 wt %, more preferably at least 70 wt %, even more preferably at least 80 wt %. One or more fillers may be added as is expedient in the present art. One or more of cross-linking agents, mold release agents, flow improving agents, anti-adhesive agents, plasticizers, anti-oxidants, etc. also may be added in customary amounts in a known manner depending upon the particular manufacturing process and/or the desired properties of the sealing lip.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved radial shaft seals, as well as methods for manufacturing and using the same.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

REFERENCE NUMBER LIST

1 Radial-shaft sealing assembly
2 Support ring
3 Sealing lip
4 Cylindrically-formed surface section
5 Shaft
6 First annular ridge
7 Second annular ridge
8 First pumping element
9 Second pumping element
10 First flank
11 Second flank
12 Flank
13 Flank
14 Fluid guide element
15 Reinforcing ridge
19 Dust lip
AS Air side
OS Oil side
U Circumferential direction
X Axis of the shaft
α Angle
β Flank angle
γ Flank angle
δ Flank angle
ε Flank angle

I claim:

1. A radial-shaft sealing assembly, comprising:
a support ring, and at least one sealing lip disposed on the support ring and having a cylindrically formed surface section configured to abut on a shaft in order to seal the shaft in an axial direction thereof between an air side and an oil side, wherein the at least one sealing lip is comprised of an elastomeric material, and a profiling for pumping of oil during rotation of the shaft is disposed or defined in or on the cylindrically formed surface section, the profiling comprising: a first radially inwardly projecting annular rib configured to abut on the shaft, wherein the first annular rib is disposed adjacent to the air side in a first edge region of the cylindrically formed surface section, a second radially inwardly projecting annular rib configured to abut on the shaft, wherein the second annular rib is disposed adjacent to the oil side in a second edge region of the cylindrically formed surface section, a plurality of first radially-projecting pumping elements disposed in an axial region between the first and second annular ridges ribs and distributed around a circumference of the cylindrically formed surface section, each of the first radially-projecting pumping elements extending at an angle (α) to a circumferential direction (U) of the cylindrically formed surface section, and a plurality of second radially-projecting pumping elements disposed in an axial region between the first and second annular ridges ribs and distributed around a circumference of the cylindrically formed surface section, each of the second radially-projecting pumping elements extending at the angle (α) to the circumferential direction (U) of the cylindrically formed surface section, but with an opposite orientation to the circumferential direction (U), wherein the first radially-projecting pumping elements are circumferentially spaced from the second radially-projecting pumping elements.

2. The radial-shaft sealing assembly according to claim 1, wherein the first radially-projecting pumping elements alternate with the second radially-projecting pumping elements in the circumferential direction (U).

3. The radial-shaft sealing assembly according to claim 1, wherein the angle (α) of the pumping elements relative to the circumferential direction (U) is $5° \leq \alpha \leq 30°$.

4. The radial-shaft sealing assembly according to claim 1, wherein the pumping elements do not contact the first annular rib in the first edge region adjacent to the air side.

5. The radial-shaft sealing assembly according to claim 1, wherein the first annular rib and/or the second annular rib has (have) a contour in the radial section and the contour includes: a first flank facing towards the air side at a first angle (β) to a rotational axis (X) of the shaft and a second flank facing towards the oil side at a second angle (γ) to the rotational axis (X) of the shaft, wherein the first flank angle (β) is smaller than the second flank angle (γ).

6. The radial-shaft sealing assembly according to claim 5, wherein the first flank angle (β) is $10° \leq \beta \leq 20°$ and the second flank angle (γ) is $40° \leq \gamma \leq 60°$.

7. The radial-shaft sealing assembly according to claim 1, wherein the first and second pumping elements each have a contour in a section perpendicular to a longitudinal axis of the pumping elements and the contour includes first and second flanks respectively having first and second flank angles (δ, ε), wherein the first and second flank angles (δ, ε) are different.

8. The radial-shaft sealing assembly according to claim 1, further comprising: a fluid guide element disposed between each set of first pumping element and second pumping element that, as viewed in the axial direction, extend towards each other in the vicinity of the first edge region adjacent to the air side.

9. The radial-shaft sealing assembly according to claim 8, wherein the fluid guide element, as viewed in the radial direction, has a triangular shape, wherein one side of the triangle borders on, or is connected to, the first annular rib and extends collinearly or parallel thereto.

10. The radial-shaft sealing assembly according to claim 9, wherein the triangle is defined by a radially inwardly projecting elevation in the cylindrically formed surface section (4).

11. The radial-shaft sealing assembly according to claim 8, wherein the fluid guide element is defined by radially inwardly projecting ridge sections in the cylindrically formed surface section of the at least one sealing lip.

12. The radial-shaft sealing assembly according to claim 1, further comprising: a plurality of reinforcing ridges disposed on a radially-outer surface of the cylindrically formed surface section of the at least one sealing lip, each reinforcing ridge extending parallel to a rotational axis of the shaft.

13. The radial-shaft sealing assembly according to claim 1, wherein: the first radially-projecting pumping elements alternate with the second radially-projecting pumping elements in the circumferential direction (U), the angle (α) of the pumping elements relative to the circumferential direction (U) is 5°≤α≤30°, and none of the pumping elements contact the first annular rib, such that a gap exists in the axial direction between a terminal end of each pumping element and the first annular rib.

14. The radial-shaft sealing assembly according to claim 13, wherein the first annular rib and/or the second annular rib has (have) a contour in the radial section and the contour includes: a first flank facing towards the air side at a first angle (β) to a rotational axis (X) of the shaft and a second flank facing towards the oil side at a second angle (γ) to the rotational axis (X) of the shaft, wherein the first flank angle (β) is 10°≤β≤20° and the second flank angle (γ) is 40°≤γ≤60°.

15. The radial-shaft sealing assembly according to claim 14, wherein the first and second pumping elements each have a contour in a section perpendicular to a longitudinal axis of the pumping elements and the contour includes first and second flanks respectively having first and second flank angles (δ, ε), wherein the first and second flank angles (δ, ε) are different.

16. The radial-shaft sealing assembly claim 15, further comprising: a fluid guide element disposed between each set of first pumping element and second pumping element that, as viewed in the axial direction, extend towards each other in the vicinity of the first edge region adjacent to the air side.

17. The radial-shaft sealing assembly according to claim 16, wherein the fluid guide element, as viewed in the radial direction, has a triangular shape, wherein one side of the triangle borders on, or is connected to, the first annular rib and extends collinearly or parallel thereto.

18. The radial-shaft sealing assembly according to claim 17, further comprising: a plurality of reinforcing ridges disposed on a radially-outer surface of the cylindrically formed surface section of the at least one sealing lip, each reinforcing ridge extending parallel to the rotational axis of the shaft.

19. A radial shaft seal, comprising: a support ring, at least one sealing lip disposed on the support ring and having a cylindrical surface section configured to abut on a rotatable shaft in order to seal the shaft between an air side of the sealing assembly and an oil side of the sealing assembly, wherein the sealing lip at least substantially comprises elastomeric material, a profiling configured to pump oil or lubricant when the shaft rotates is disposed or defined in or on the cylindrical surface section, the profiling comprising: a first radially inwardly projecting annular rib configured to abut on the shaft and disposed in or on a first edge region of the cylindrical surface section that is adjacent to the air side, a second radially inwardly projecting annular rib configured to abut on the shaft and disposed in or on a second edge region of the cylindrical surface section that is adjacent to the oil side, the second edge region being spaced from the first edge region in an axial direction of the sealing assembly, a plurality of first pumping ribs disposed between the first and second annular ribs in the axial direction, the first pumping ribs projecting radially inwardly from the cylindrical surface section, being distributed around a circumference of the cylindrical surface section, and extending at a first angle to a tangent to a circumferential direction (U) of the cylindrical surface section, and a plurality of second pumping ribs disposed between the first and second annular ribs in the axial direction, the second pumping ribs projecting radially inwardly from the cylindrical surface section, being distributed around the circumference of the cylindrical surface section, and extending at a second angle to the tangent to the circumferential direction (U) of the cylindrical surface section, wherein the first angle equals 180° minus the second angle and wherein the first pumping ribs are circumferentially spaced from the second pumping ribs.

20. A radial-shaft seal, comprising:
a support ring, and
at least one elastomeric sealing lip disposed on the support ring and having a cylindrical surface section configured to abut on a shaft in order to seal the shaft in an axial direction thereof between an air side and an oil side, the sealing lip having a circular free end,
the cylindrical surface section including a profiling configured to pump oil during rotation of the shaft, the profiling comprising:
a first annular rib projecting radially inwardly from a first location on the cylindrical surface section, the first annular rib having a first flank facing toward the circular free end and a second flank facing away from the circular free end, and the first annular rib being configured to abut on the shaft,
a second annular rib projecting radially from a second location on the cylindrical surface section such that the first annular rib is located between the circular free end and the second annular rib, the second annular rib having a first flank facing toward the circular free end and a second flank facing away from the circular free end, and the second annular rib being configured to abut on the shaft,
wherein the second flank of the first annular rib is axially separated from the first flank of the second annular rib by an annular channel,
a plurality of first radially-inwardly projecting pumping ribs disposed at least partially in the annular channel and distributed around a circumference of the cylindrical surface section, each of the first radially-inwardly projecting pumping ribs extending at an angle to a circumferential direction of the cylindrical surface section, and a plurality of second radially-inwardly projecting pumping ribs disposed at least partially in the annular channel and distributed around the circumference of the cylindrical surface section, each of the second radially-inwardly projecting pumping ribs extending at the angle to the circumferential direction of the cylindrical surface section, but with an opposite orientation to the circumferential direction.

21. The radial shaft seal according to claim 20, wherein a first set of the plurality of first radially-inwardly projecting pumping ribs contacts the second flank of the first annular rib and a first set of the plurality of second radially-inwardly projecting pumping ribs is spaced from the first flank of the second annular rib.

22. The radial-shaft sealing assembly according to claim 1, wherein the plurality of first radially-projecting pumping elements each have an air-side end and an oil-side end and a length from the air-side end to the oil-side end and first and second flanks projecting radially inward from a radially inner surface of the cylindrically formed surface section,
wherein the plurality of second radially-projecting pumping elements each have an air-side end and an oil-side end and a length from the air-side end to the oil-side end and first and second flanks projecting radially inward from a radially inner surface of the cylindrically formed surface section, and wherein the first and second flanks of the first radially-projecting pumping elements do not touch the first or second flanks of the second radially-projecting pumping elements.

23. A radial shaft seal comprising:
a shaft; and
the radial-shaft sealing assembly according to claim 1,
wherein the first radially inwardly projecting annular rib abuts on the shaft and the second radially inwardly projecting annular rib abuts on the shaft.

24. The radial-shaft sealing assembly according to claim 1, wherein each of the first plurality of radially-projecting pumping elements comprises a radially inwardly projecting pumping rib and wherein each of the second plurality of radially-projecting pumping elements comprises a radially inwardly projecting pumping rib.

* * * * *